(12) United States Patent
Malhotra et al.

(10) Patent No.: US 10,327,267 B1
(45) Date of Patent: Jun. 18, 2019

(54) CONTROL OF RELAY BEARER QOS CONFIGURATION BASED ON MESSAGING FROM IMS PLATFORM

(71) Applicant: Sprint Spectrum L.P., Overland Park, KS (US)

(72) Inventors: Rajil Malhotra, Olathe, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 13 days.

(21) Appl. No.: 15/669,514

(22) Filed: Aug. 4, 2017

(51) Int. Cl.
*H04W 76/10* (2018.01)
*H04W 40/22* (2009.01)
*H04W 28/02* (2009.01)
*H04W 80/04* (2009.01)

(52) U.S. Cl.
CPC ....... *H04W 76/10* (2018.02); *H04W 28/0268* (2013.01); *H04W 40/22* (2013.01); *H04W 80/04* (2013.01)

(58) Field of Classification Search
CPC . H04W 28/06; H04W 28/0268; H04W 40/22; H04W 80/04; H04W 76/10
USPC ....................................................... 370/315
See application file for complete search history.

(56) References Cited

U.S. PATENT DOCUMENTS

| | | |
|---|---|---|
| 6,683,853 B1 | 1/2004 | Kannas et al. |
| 9,560,660 B1 | 1/2017 | Oroskar et al. |
| 9,743,312 B1 | 8/2017 | Malhotra et al. |
| 2004/0071086 A1 | 4/2004 | Haumont et al. |
| 2004/0106405 A1 | 6/2004 | Gabriel et al. |
| 2010/0318670 A1 | 12/2010 | Al-Shalash et al. |
| 2011/0103294 A1* | 5/2011 | Liu ......................... H04B 7/155 370/315 |
| 2011/0223918 A1 | 9/2011 | Dahlen et al. |
| 2012/0250509 A1* | 10/2012 | Leung ............... H04W 28/0252 370/235 |
| 2012/0287790 A1 | 11/2012 | Huang et al. |
| 2013/0051332 A1 | 2/2013 | Sridhar |
| 2013/0272197 A1 | 10/2013 | Avila Gonzalez et al. |

(Continued)

FOREIGN PATENT DOCUMENTS

| | | |
|---|---|---|
| EP | 2 903 304 | 8/2015 |
| WO | WO2013/123467 | 8/2013 |
| WO | WO2016/059063 | 4/2016 |

OTHER PUBLICATIONS

U.S. Appl. No. 15/669,505, filed Aug. 4, 2017.

(Continued)

*Primary Examiner* — Phong La

(57) ABSTRACT

As IMS-based sessions are established for UEs served by a relay base station, the IMS platform will signal to a core network to request setup of bearers for carrying traffic of the IMS-based sessions and will identify the relay base station serving the UEs. Based on this IMS signaling messages identifying the relay base station serving the UEs for which the bearers are being set up, the core network will track a count of such bearers established for UEs served by the relay base station. And upon detecting that the tracked count reaches a threshold level, the core network will trigger adjustment of a maximum bit rate and/or other QoS attribute of a relay bearer established for providing aggregate wireless backhaul connectivity for the relay base station.

14 Claims, 5 Drawing Sheets

(56) References Cited

U.S. PATENT DOCUMENTS

| | | |
|---|---|---|
| 2013/0301558 A1* | 11/2013 | Zakrzewski ...... H04W 28/0215 |
| | | 370/329 |
| 2013/0329559 A1 | 12/2013 | Cabrera |
| 2014/0024383 A1 | 1/2014 | Rahman et al. |
| 2014/0086052 A1 | 3/2014 | Cai et al. |
| 2014/0219083 A1 | 8/2014 | Mandyam et al. |
| 2014/0347996 A1 | 11/2014 | Rahman et al. |
| 2015/0045032 A1* | 2/2015 | Tomici ................. H04W 36/04 |
| | | 455/436 |
| 2015/0085660 A1 | 3/2015 | Harris et al. |
| 2015/0098325 A1 | 4/2015 | Lu et al. |
| 2016/0183119 A1 | 6/2016 | Tjandra et al. |
| 2016/0226922 A1 | 8/2016 | Russell et al. |
| 2016/0381620 A1 | 12/2016 | Panaitopol et al. |
| 2017/0048877 A1 | 2/2017 | Wang |
| 2017/0201902 A1 | 7/2017 | Chen et al. |
| 2017/0367139 A1 | 12/2017 | Jang et al. |
| 2018/0234524 A1 | 8/2018 | Cheng et al. |

OTHER PUBLICATIONS

First Action Interview Pilot Program Pre-Interview Communication from U.S. Appl. No. 15/669,505, dated Dec. 14, 2018.
Office Action from U.S. Appl. No. 15/669,505, dated Apr. 25, 2019.

* cited by examiner

CONTROL OF RELAY BEARER QOS CONFIGURATION BASED ON MESSAGING FROM IMS PLATFORM

INCORPORATION BY REFERENCE

This application incorporates by reference in its entirety the U.S. patent application filed on the same date as the present application by the same applicant, naming the same inventors, and entitled "Method and System for Controlling Communication on a Relay Bearer."

BACKGROUND

A typical wireless communication system includes a number of base stations each radiating to provide coverage in which to serve user equipment devices (UEs) such as cell phones, tablet computers, tracking devices, embedded wireless modules, and other wirelessly equipped devices, whether or not user operated. In turn, each base station may connect with a core network that includes entities such as a network controller and a gateway system that provides connectivity with an external transport network such as the Internet. With this arrangement, a UE within coverage of the system may engage in air interface communication with a base station and may thereby communicate via the base station with various remote network entities or with other UEs served by the base station.

Such a system could operate in accordance with a particular radio access protocol, examples of which include, without limitation, Long Term Evolution (LTE) (using Orthogonal Frequency Division Multiple Access (OFDMA) and Single Carrier Frequency Division Multiple Access (SC-FDMA), Code Division Multiple Access (CDMA) (e.g., 1xRTT and 1xEV-DO), Global System for Mobile Communications (GSM), IEEE 802.11 (WIFI), BLUETOOTH, and others. Each protocol may define its own procedures for registration of UEs, initiation of communications, handover between base station coverage areas, and other functions.

Each base station coverage area in such a system could define an air interface on one or more carriers (carrier frequencies), providing uplink and downlink frequency bandwidth multiplexed to establish air interface resources for carrying communications between the base station and UEs. For instance, in LTE, the air interface could span a frequency bandwidth such as 10 MHz, 15 MHz, or 20 MHz, and the air interface is divided over frequency into 15 kHz subcarriers, and over time into 10-millisecond frames each divided into ten 1-millisecond subframes, in turn divided into 14 symbol time segments. With this arrangement, the LTE air interface defines an array of resource elements each occupying a 15 kHz subcarrier and a single symbol time segment, and each resource element can be modulated to carry data.

When a UE initially enters into coverage of such a system and detects coverage on a carrier, the UE could engage in a process to establish a radio-link layer connection with a base station that provides the coverage and could then engage in an attach process through which the system becomes configured to serve the UE. In an example attach process, the UE transmits an attach request over the air to the base station, and the base station forwards the attach request to the network controller in the core network. After authenticating and authorizing the UE, the network controller then engages in signaling with the base station and with the gateway system, to coordinate and trigger establishment of one or more network connections for the UE. In particular, this process results in setup of one or more bearer connections or "bearers" each defining a communication channel extending between the UE and the gateway system via the base station, including a radio portion extending between the UE and the base station and an access portion extending between the base station and the gateway system. Further, the gateway system or an associated server could assign an Internet Protocol (IP) address for use by the UE to engage in packet data communication.

Any such bearer established for a UE may have a corresponding defined service level, which could be indicated by one or more bearer attributes stored in context records for the UE at entities along the bearer path, such as at the UE, the base station, and the gateway system. For example, the service level could be indicated by a quality of service class identifier (QCI) and/or corresponding differentiated services point code (DSCP) value, which could be predefined to require handling of communications along the bearer in a particular manner. For instance, a high QCI level bearer, such as a bearer with any of QCIs 1-5, could have a designated guaranteed minimum bit rate (GBR), so entities along the bearer path would treat communications on the bearer as having relatively high priority as compared with other communications, in an effort to satisfy that minimum bit-rate requirement. Whereas a low QCI level bearer, such as a bearer with any of QCIs 6-9, could be deemed to receive merely best-efforts service, with no guaranteed minimum bit rate.

In a representative system, when a UE first attaches, the network could establish for the UE a default QCI 9 (best efforts) bearer for carrying general Internet communications such as e-mail, web browsing, and file transfer communications. Further, if the UE supports voice over Internet Protocol (VoIP) service, the network could also initially establish for the UE a QCI 5 bearer for carrying VoIP call control signaling (e.g., Session Initiation Protocol (SIP) signaling), so that the UE can engage in signaling to set up VoIP calls. Further, when a UE places or receives a VoIP call, the network could then further establish for the UE a QCI 1 bearer for carrying conversational-voice traffic (digitized, encoded voice data) of the VoIP call. Other bearers could also be established for the UE as appropriate.

Each such bearer could support communication between the UE and the gateway system and thus ultimately between the UE and a packet data network with which the gateway system provides connectivity. For instance, when data arrives at the gateway system for transmission along a particular bearer to the UE, the gateway system could transmit the data to the base station, the base station could allocate downlink air interface resources to carry the data to the UE, and the base station could then transmit the data on those allocated resources to the UE. And when the UE has data to transmit along a particular bearer to the gateway system for transmission on the packet data network, the base station could allocate uplink air interface resources to carry the data from the UE, the UE could transmit the data on those allocated resources to the base station, and the base station then transmit the data to the gateway system for output onto the packet data network.

To help ensure that sufficient air interface resources are available to be allocated for use to serve a GBR bearer, a GBR bearer could also have a designated maximum bit rate, indicating the highest bit rate that the bearer would be expected to support. The maximum bit rate could be based on the type of communication that the bearer is expected to carry. For instance, a QCI 1 bearer established for carrying voice traffic could have a designated maximum bit rate based on the bit rate of a voice codec that is or would likely be used for a voice call, such as 50 kilobits-per-second for example. Whereas, a QCI 2 bearer designated to carry live video streaming could have a designated maximum bit rate based on the bit rate of a video codec that is or would likely be used for the video stream, which might range from a few hundred kilobits per second to tens of megabits per second.

When the network controller sets up such a GBR bearer (e.g., when the UE engages in session initiation signaling such as SIP signaling to set up the associated communication), the network controller could inform the base station what the bearer's designated maximum bit rate is, and the base station could store that designated maximum bit rate in the UE's context record as an attribute of the bearer. Pursuant to the designated maximum bit rate, the base station could then reserve for the bearer a certain extent of air interface resources that would be sufficient to accommodate that maximum bit rate. For instance, the base station could determine, based on air interface channel quality reported by the UE, what quantity of air interface resources (e.g., resource elements) per unit time would be needed in order to carry data communication with the UE at the maximum bit rate, and the base station could reserve that quantity of air interface resource elements per unit time, to help ensure that the air interface can accommodate communication with the UE at up to that bit rate on the GBR bearer.

OVERVIEW

Optimally, a wireless service provider will strategically implement base stations throughout a market area so that served UEs can move between the base stations' coverage areas without loss of coverage. Each base station could include an antenna structure and associated equipment, and the wireless service provider could connect the base station by a landline cable (e.g., a T1 line) with the service provider's core network, to enable the base station to communicate with the network controller, the gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient, impossible, or undesirable to run landline cables to every one of those small-cell base stations.

To connect a base station with the core network in such a situation, the wireless service provider could implement a wireless relay backhaul connection in which the base station includes or is interconnected with a special UE that is served by a base station already connected with the core network. With this arrangement, the existing core-network-connected base station is referred to as a "donor base station," the special UE is referred to as a "relay-UE" (or "UE-relay"), and the base station at issue is referred to as a "relay base station." In operation, the donor base station then serves the relay-UE in much the same way as any base station would serve a UE, the relay-UE interfaces with the relay base station, operating as an intermediary between the relay base station and the donor base station, and the relay base station serves other UEs in much the same way as any base station would. Cooperatively, the relay base station and relay-UE in this arrangement could be considered a "relay" or "relay node."

To enable the relay base station in this arrangement to communicate with other entities in or via the core network (such as with the network controller, the gateway system, and other base stations), the service provider could implement a relay-gateway system (relay gateway) or the like within the core network and could establish for the relay-UE one more bearers each extending between the relay-UE and the relay-gateway system via the donor base station. (In practice, the relay-gateway system could be integrated with the conventional-gateway system discussed above but could serve to provide internal core network connectivity rather than external transport network connectivity.)

In particular, when the relay-UE is put into service and sends an attach request to the donor base station, the relay-UE could include a special identifier indicating that the relay-UE is a relay-UE rather than a conventional end-user UE. Upon receipt of that attach request, the network controller could thus determine that the relay-UE is a relay-UE as opposed to an end-user UE and, in response, could coordinate, trigger, or facilitate setup of one or more bearers between the relay-UE and the internal relay-gateway system rather than between the relay-UE and the conventional-gateway system. Further, the relay-gateway system or an associated server could assign an IP address to the relay-UE, for use by the relay-UE to communicate within the core network. And the relay-gateway system could assign an IP address to the relay base station, for use by the relay base station to communicate within the core network.

With this arrangement in place, the relay base station could then engage in communication with other core network entities (e.g., with the network controller, the conventional-gateway system, and other base stations) as any other base station would do. However, the communication would pass via the wireless relay backhaul connection and the relay-gateway system. In particular, the communication would pass via (i) the connection or integration between the relay base station and the relay-UE and (ii) one of the relay-UE's bearers via the donor base station, with the donor base station coordinating air interface transmission between the relay-UE and the donor base station in much the same way as discussed above.

In essence with this arrangement, when a UE is served by the relay base station and the system establishes for the UE one or more bearers, each UE bearer would extend between the UE and the core network gateway system as discussed above but would pass through a relay-UE bearer including the relay-UE's air interface connection with the donor base station. When the UE's bearers are established initially, the bearers would be routed through the relay-gateway system and donor base station, between the UE and the conventional-gateway system.

Thus, when the conventional-gateway system receives data destined to the UE, in order for the gateway system to transmit the data to the UE's serving relay base station, the conventional-gateway system would transmit the data to the relay-gateway system, the relay-gateway system would transmit the data to the donor base station, the donor base station would coordinate air interface transmission of the data to the relay-UE, and the relay-UE would pass the data to the relay base station for transmission to the UE. And likewise, when the relay base station receives data transmitted from the UE for output on the packet data network, the relay base station would pass the data to the relay-UE, the donor base station would coordinate air interface transmission of the data from the relay-UE to the donor base station, the donor base station would pass the data to the relay-gateway system, and the relay-gateway system would pass the data to the conventional-gateway system for output on the packet data network.

In a system that supports VoIP call service, the network controller could initially establish for such a relay-UE a QCI 1 bearer for use to carry voice traffic that would be communicated to/from any end-user UEs that would be served by the associated relay base station and that might engage in VoIP calls. This QCI 1 bearer could be established in advance for the relay-UE, so that the bearer would be in place for carrying VoIP call traffic if and when any UE served by the associated relay base station engages in a VoIP call.

In establishing this QCI 1 bearer for the relay-UE, the network controller or other entity could designate for the bearer a maximum bit rate that would cause the donor base station to reserve sufficient air interface resources to support up to a likely extent of VoIP call traffic. In particular, this maximum bit rate for the relay-UE's QCI 1 bearer could be set based on an assumption of the quantity of VoIP calls that might be handled concurrently (e.g., with multiple UEs served by the associated relay base station being concurrently engaged in VoIP calls) and based on the likely bit rate of those VoIP calls. For instance, if the assumption is that the relay might handle up to five concurrent VoIP calls at a rate of up to 50 kbps per call, then the maximum bit rate of the relay-UE's QCI 1 bearer could be set at 250 kbps. Upon designation of this maximum bit rate for the relay-UE's QCI 1 bearer, the donor base station could then reserve an extent of air interface resources sufficient to accommodate up to that maximum bit rate, considering the relay-UE's channel conditions for instance.

Optimally, the maximum bit rate for the relay-UE's QCI 1 bearer would not be set too high, as doing so may result in the donor base station reserving excessive air interface resources unnecessarily. On the other hand, there may be times when the extent of VoIP traffic on the relay-UE's QCI 1 bearer approaches and perhaps exceeds the extent expected, in which case the donor base station may not have sufficient available air interface resources to accommodate allocation for all of the VoIP call traffic. Unfortunately, this could result in blocked or delayed communication of such traffic over the air interface between the relay-UE and the donor base station, which could in turn result in user-experience issues. Consequently, an improvement is desired.

Disclosed herein is a method and system to help address this issue, with respect to a relay node's established QCI 1 bearer (or other relay-node bearer for that matter). In accordance with the disclosure, a representative QCI 1 bearer established for a relay node would have a configured QoS level, including a designated maximum bit rate. As end-user UEs served by the relay node then set up VoIP calls through signaling with an Internet Multimedia System (IMS) platform, the IMS platform could signal to the core network to trigger setup of QCI 1 bearers for those UEs and could include in that signaling an identifier of the relay node that is serving those UEs. Based on that IMS signaling indicating that the UEs at issue are served by the relay node, the core network could thus track a count of how many QCI 1 bearers are established for UEs served by that relay node. And based on that count, the core network could adjust the QoS level of the relay node's QCI 1 bearer.

By way of example, as end-user UEs served by the relay node engage in SIP signaling with the IMS platform to set up voice calls, each UE could provide in its SIP signaling to the IMS platform a P-Access-Network-Identifier (PANI) header that includes a unique identifier (e.g., an E-UTRAN Cell Global Identifier (ECGI)) of the UE's serving base station, having a value classified to indicate that the serving base station is a relay node. For each such VoIP call setup, as the IMS platform signals to the core network to trigger establishment of a QCI 1 bearer to carry the VoIP call traffic to/from the UE, the IMS platform could include in its signaling to the core network the PANI or at least the relay node identifier. And the core network could thus determine based on that signaling that a QCI 1 bearer is being established for a UE served by the relay node.

Based on such determinations, the core network could thus track the total number of such QCI 1 bearers currently in place for UEs that are served by the relay node (i.e., the total number of QCI 1 bearers traversing the relay node and thus the relay node's QCI 1 bearer). And in response to that total number reaching a threshold high level (e.g., a threshold high percentage of the number of such bearers that formed the basis for initially setting the QCI 1 bearer's maximum bit rate), the core network could trigger an increase of the maximum bit rate of the relay node's QCI 1 bearer, to help ensure that the donor base station will reserve for the relay node's QCI 1 bearer an extent of air interface resources that will be sufficient to accommodate the aggregate traffic of the determined number of QCI 1 bearers traversing the relay node's QCI 1 bearer.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus on application in the context of LTE as an example radio access protocol and associated network arrangement and specifically to application with respect to an existing QCI 1 conversational-voice bearer established for a relay node. However, it will be understood that principles of the disclosure can extend to apply in other scenarios as well, such as with respect to other radio access protocols and with respect to other relay bearers. Further, even within the context presented, variations from the details disclosed may be possible. For instance, elements, arrangements, and functions may be added, removed, combined, distributed, or otherwise modified. In addition, it will be understood that functions described as being performed by one or more entities may be implemented in various ways, such as by a processing unit executing software instructions for instance.

Figure 1:
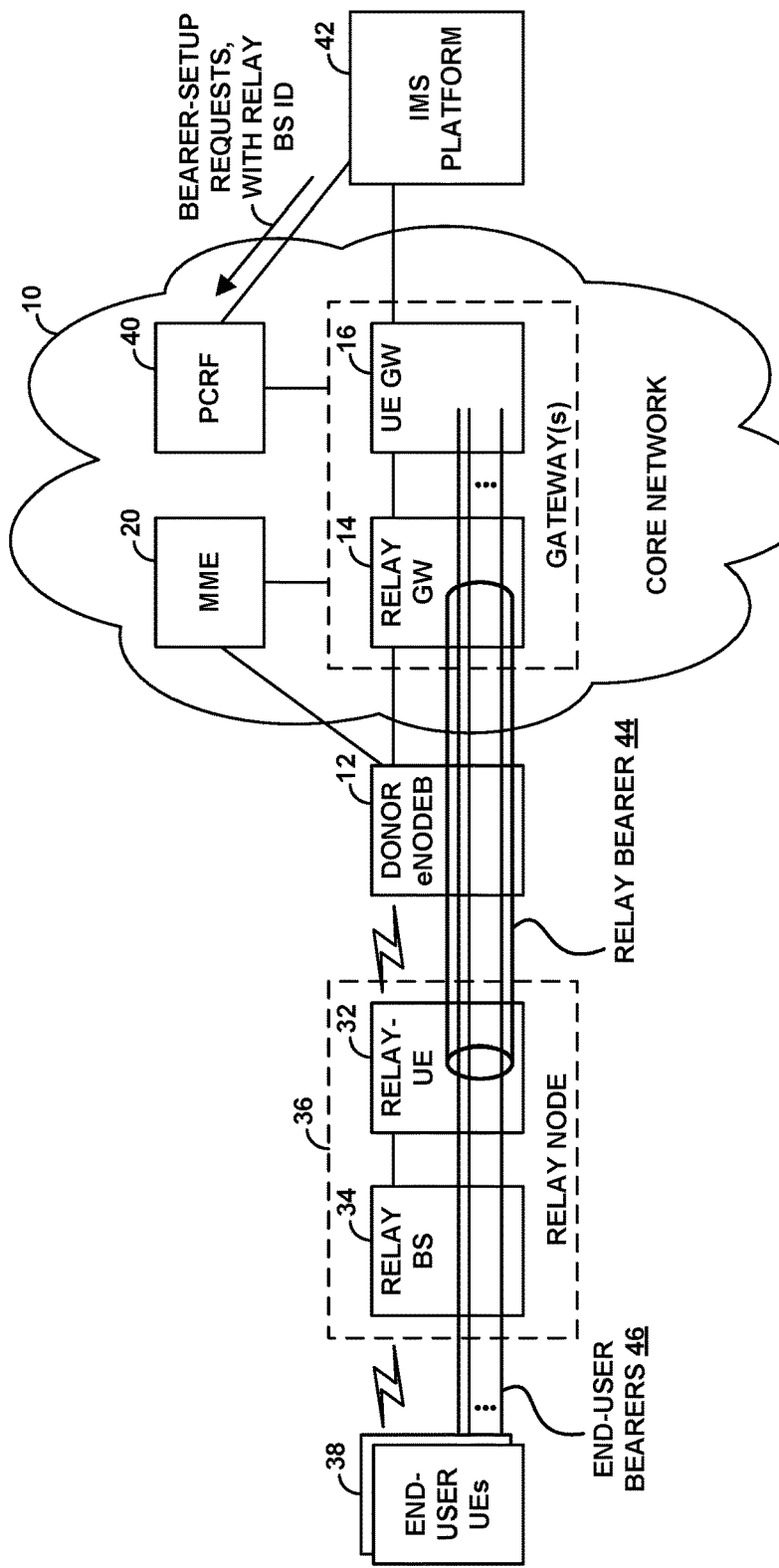
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts a representative LTE core network 10, which functions primarily to serve UEs with wireless packet data communication service, including possibly voice-over-packet (voice over LTE (VoLTE)) service, but may also provide other functions. The core network 10 could be a packet-switched network compliant with the industry standard system architecture evolution (SAE) for the LTE protocol, and thus the entities shown on the core network could each have an IP address and be configured to communicate with each other over packet-based tunnels or other communication interfaces.

Network 10 includes or is interconnected with an example donor base station (BS) 12, which would have an antenna structure and associated equipment (not shown) for providing LTE coverage in which to serve the UEs. In particular, the donor base station could provide coverage on a representative carrier that is configured as discussed above to have a finite extent of resource elements per unit time for carrying communications between the donor base station its served UEs. The donor base station 12 is then in communication with an example relay-gateway system 14 (also referred to as a relay-SAEGW or an infrastructure-SAEGW) and an example conventional-gateway system 16 (also referred to as an SAEGW, a UE-GW, or a UE-SAEGW).

The relay-gateway system 14 provides connectivity into the core network, to facilitate communication with other entities such as (i) the conventional-gateway system 16, (ii) a mobility management entity (MME) 20 that functions as a network controller, and (iii) other base stations. The relay-gateway system 14 could include a serving gateway (relay-SGW) (not shown) and a packet-data network gateway (relay-PGW) (not shown). In practice, the relay-SGW may have interfaces with the donor base station, the relay-PGW, and the MME 20, and the relay-PGW may function as a gateway generally into the core network, to facilitate communication with the other core network entities.

The conventional-gateway system, on the other hand, provides connectivity with an external packet-switched transport network (not shown), to facilitate communication on that network. Similar to the relay-gateway system, the conventional-gateway system 16 could include an SGW (UE-GW) (not shown) and a PGW (UE-PGW) (not shown). And in practice, the UE-SGW may have interfaces with base stations, the MME 20, and the UE-PGW, and the UE-PGW may function as a gateway into the external packet-switched network, to facilitate communication on that network.

As noted above, the relay-gateway system and conventional-gateway system could be integrated together but could serve these different purposes, with the relay-gateway system providing for internal core-network communication and the conventional-gateway system providing for external transport network communication.

FIG. 1 also shows as a component of the core network an example policy server, namely a policy charging and rules function (PCRF) 40. The PCRF 40 operates as a policy decision point to manage policy enforcement by the PGWs of the relay-gateway system 14 and the conventional gateway system 16. For example, the PCRF could determine service policies to apply for UEs served by these gateways and could responsively direct gateway-implementation of the determined service policies. Further, the PCRF could modify the service policies from time to time.

In addition, the figure shows within coverage of donor base station 12 a representative relay-UE 32, which may be a conventional or specially configured UE that is in place to provide wireless backhaul connectivity for at least one relay base station 34, the relay-UE and relay base station 34 cooperatively defining a relay node 36. With this arrangement, the donor base station 12 serves the relay-UE 32 over an air interface, and the relay-UE 32 functions as an intermediary between the donor base station 12 and the relay base station 34, thus providing the relay base station with wireless backhaul connectivity to the core network 10. And the relay base station is then configured to serve one or more other UEs 38.

Further, the figure depicts a representative Internet Multimedia Subsystem (IMS) platform 42 accessible via conventional-gateway 16. The IMS platform 42, which could comprise a number of nodes (not shown) such as call session control functions, media gateways, and media servers, operates to support real-time packet-based media communication, such as VoIP call communication. For instance, the IMS platform could engage in SIP signaling with an end-user UE 38 to set up a VoIP call (placed to or from the UE) and could responsively engage in control signaling with the core network to trigger setup of a QCI 1 bearer for carrying the associated voice call traffic between that UE and conventional gateway-system 16, so as to facilitate VoIP call communication between the UE and the IMS platform. The IMS platform could then operate to bridge that VoIP call communication with a remote call party, so as to allow the VoIP call to proceed.

As discussed above, when relay-UE 32 is put into service, the relay-UE could detect sufficient coverage of donor base station 12 and could responsively establish a radio-link-layer connection with the donor base station and an attach process with the network. Through the attach process, the MME 20 could coordinate establishment for the relay-UE 32 (and thus for the relay node 36) of at least a QCI 1 bearer 44 for carrying voice traffic that would be communicated to/from any end-user UEs that would be served by the associated relay base station and that might engage in VoIP calls. And in setting up this QCI 1 bearer, the MME could designate for the bearer a maximum bit rate that might be sufficient to accommodate up to the rate of voice traffic expected on the QCI 1 bearer.

For example, the MME could engage in signaling with the relay-SGW to trigger setup of an S5 tunnel between the relay-SGW and relay-PGW, and the MME could engage in signaling with the relay-SGW and with the donor base station to coordinate setup of an S1 tunnel between the donor base station and the relay-SGW, with the donor base station in turn engaging in associated signaling with the relay-UE. This process could thus result in setup of a bearer 44 that extends between the relay-UE 32 and the relay-PGW, via the donor base station, the S1 tunnel, the relay-SGW, and the S5 tunnel. Further, through this process, the MME could specify (e.g., to both the donor base station and the relay-gateway system 14) that the bearer is a QCI 1 bearer having an associated guaranteed minimum bit rate, and the MME could specify a designated maximum bit rate for the QCI 1 bearer, perhaps to accommodate multiples of an expected per-voice-call maximum bit rate as discussed above.

The donor base station, the relay-SGW, and the relay-PGW could then each store a context record for the relay-UE 32, indicating an identity of this bearer, indicating that the bearer is a QCI 1 bearer, and indicating the bearer's designated maximum bit rate, among possibly other bearer attributes and associated information.

Further, pursuant to the designated maximum bit rate, the donor base station could then set itself to reserve an extent of air interface resources sufficient to accommodate up to that maximum bit rate for communication with the relay-UE. For instance, as noted above, the donor base station could determine the relay-UE's channel quality (e.g., based on channel-quality reporting from the relay-UE) and, based on the channel quality, could determine how many bits could likely be represented per resource element, and the donor base station could then set itself to reserve a particular rate of resource elements (e.g., physical resource blocks each encompassing a group of resource elements) that would then accommodate the maximum bit rate designated for the relay-UE's QCI 1 bearer. This reservation of resources could involve the donor base station programmatically setting aside periodically an associated quantity of air interface resources for possible allocation to carry communication on the relay-UE's QCI 1 bearer, which might preclude use of those resources for other purposes.

In practice with this arrangement, as UEs 38 served by the relay base station 36 place and receive VoIP calls, the network could also establish for those UEs respective QCI 1 bearers for carrying the voice traffic of those VoIP calls.

In particular, when a UE 38 engages in SIP signaling with the IMS platform 42 to set up such a call, the IMS platform 42 could responsively signal to the PCRF 40 of the core network to request setup for the UE of a QCI 1 bearer for carrying the voice call traffic of the VoIP call. This signaling from the IMS platform to the PCRF 40 could identify the UE and could specify that the session being established is a VoIP call having a particular bit rate, perhaps a voice codec rate that the UE and IMS platform negotiated for the VoIP call. In response, the PCRF 40 could then signal to the UE-PGW to request setup of a QCI 1 bearer for the UE, to carry voice traffic of the VoIP call. And in response to this directive, the UE-PGW could engage in network-initiated bearer setup for the UE. Namely, the UE-PGW could send a create-bearer request to the UE-SGW, and the UE-SGW could responsively signal to the MME 20, and the MME could coordinate setup of the QCI 1 bearer for the UE 38. This bearer would thus extend between the UE 38 and the conventional-gateway system 16, via the relay base station 34, the relay-UE 32, the wireless backhaul between the relay-UE and the donor base station 12, the donor base station 12, and the relay-gateway system 14.

In effect with this arrangement, the end-user UE's QCI 1 bearer would traverse the relay-UE's QCI 1 bearer, and thus voice traffic flow along the end user UE's QCI 1 bearer would be routed through the relay-UE's QCI 1 bearer between the relay-UE and the relay-PGW.

For uplink communication, for instance, when the end-user UE 38 transmits voice traffic on its QCI 1 bearer to its serving relay base station 34, the relay-base station could in turn pass that traffic along to the relay-UE and would inform the relay-UE that the traffic is voice call traffic or QCI 1 traffic. Thus, the relay-UE could then work with the donor base station to coordinate uplink transmission of the voice traffic via the relay-UE's QCI 1 bearer, and the donor base station could then forward the traffic along the relay-UE's QCI 1 bearer to the relay-gateway system 14, from which the traffic could then flow to the conventional-gateway system 16 and on to the IMS platform 42.

And for downlink communication, when the conventional-gateway system 16 receives voice traffic destined to the UE, the conventional-gateway system 16 could transmit the traffic to the relay-gateway system, tagging the traffic with DSCP headers to indicate that the traffic is voice call traffic or QCI 1 traffic. The relay-PGW could then responsively transmit the traffic along the relay-UE's QCI 1 bearer to the relay-SGW, which would pass the traffic to the donor base station. And the donor base station could coordinate transmission of the traffic via the relay-UE's QCI 1 bearer to the relay-UE 32. From there, the traffic could then flow to the relay base station 34, and the relay base station 34 could coordinate transmission of the traffic over the air to the end-user UE 38.

In practice, relay base station 34 (or for that matter possibly multiple relay base stations homed to relay-UE 32) could serve multiple end-user UEs 38 that engage in VoIP calls at the same time as each other. As each such end-user UE works with the IMS platform 42 to set up a VoIP call, the IMS platform could thus signal to the core network to trigger setup for the end-user UE of an associated QCI 1 bearer for the UE's VoIP call. And as a result, multiple end-user UE QCI 1 bearers 46 could concurrently exist for UEs served by relay base station 34, with all of those QCI 1 bearers traversing (passing through) the relay-UE's QCI 1 bearer 44 as shown in FIG. 1.

As noted above, an issue that can arise with this arrangement is that the donor base station might not have sufficient air interface resources reserved for the relay-UE's QCI 1 bearer to accommodate the actual rate of voice traffic flowing on the relay-UE's QCI 1 bearer. Even though the donor base station may have reserved air interface resources sufficient to accommodate multiples of an expected per-voice-call maximum bit rate, that extent of resources may be insufficient if the number of concurrent VoIP calls served by the relay base station 34 (or perhaps multiple relay base stations homed to the same relay-UE 32) is more than expected and/or if the bit rates of those VoIP calls are higher than expected.

To help address this issue, the present disclosure provides for using signaling from the IMS platform 42 as a basis to track a count of how many QCI 1 bearers are established for end-user UEs served by relay base station 34 and, based on that count, to dynamically adjust the maximum bit rate of the relay-UE's QCI 1 bearer, so as to help ensure that the relay base station reserves an extent of air interface resources that may be sufficient to accommodate the cumulative voice traffic flow on those end-user UE QCI 1 bearers.

To facilitate this in a representative implementation, as noted above, when the IMS platform signals to the core network to request or trigger setup of a QCI 1 bearer for a VoIP call being setup for a UE served by a particular relay base station, the IMS platform will include in its signaling to the core network a PANI header that identifies the relay base station serving the UE at issue. Provided with that relay-base-station identification in each instance, the core network could thereby track a count of how many QCI 1 bearers are established for UEs served by a particular relay base station, such as by relay base station 34. And when that tracked count reaches a threshold level, the core network could adjust the maximum bit rate of the QCI 1 bearer established for the associated relay-UE 32, to help cause the donor base station serving that relay-UE to reserve a suitable extent of air interface resources for accommodating the associated traffic flow on the relay-UE's QCI 1 bearer.

When an end-user UE engages in SIP signaling with the IMS platform 42 to set up a VoIP call or other IMS-based session, the UE could include in its SIP signaling (e.g., in a SIP INVITE message) a PANI header identifying its serving base station, in order to inform the IMS platform which base station is serving the UE. This serving-base-station information could normally be used by the IMS platform for purposes such as routing of emergency calls and determining the access network (e.g., core network 10) to which the IMS platform should signal for requesting setup of an associated bearer. But here, the serving-base-station information could serve the additional advantageous function of enabling the IMS platform to report to the core network that the UE at issue is served by a particular relay base station, so that the core network can track the count of QCI 1 bearers established (co-existing) for UEs served by that relay base station.

In practice, relay base stations such as relay base station 34 could have ECGIs selected from a group of ECGIs deemed to be for relay base stations as opposed to non-relay base stations. The PANI header that a UE served by relay base station 34 provides in its SIP signaling to the IMS platform 42 could thus include the unique ECGI of relay base station 34, and the fact that that ECGI is in the group of ECGIs deemed to be for relay base stations could indicate that the base station serving the UE is a relay base station.

In a representative implementation, when the IMS platform receives SIP signaling from a UE 38 to set up a VoIP call and that SIP signaling contains a PANI header of a relay base station such as relay base station 34, the IMS platform will include that PANI header in its signaling message (e.g., an Rx Diameter message) that it sends to the PCRF 40 to request QCI 1 bearer setup for the UE 38. The IMS platform could do this in response to a determination that the ECGI in the PANI header is an ECGI of a relay base station, or the IMS platform could do this in each instance where it has received the ECGI of the base station serving the UE 38.

Processing could then proceed as normal in the core network, with the PCRF signaling to the UE-PGW to direct setup of a QCI 1 bearer to carry voice traffic of the VoIP call being set up for the UE 38. However, per the present disclosure, the PCRF could also use the ECGI as a basis to track how many such QCI 1 bearers are set up for UEs served by the indicated relay base station. In practice, for instance, the PCRF could detect that the ECGI in the PANI header provided by the IMS platform is an ECGI of a relay base station and thus, when or upon setting up a QCI 1 bearer for the end-user UE at issue, could increment a count of QCI 1 bearers established for UEs served by that relay base station. Further, upon receiving signaling from the IMS platform indicating the termination (concluding) of the VoIP call, the PCRF could accordingly decrement the count of QCI 1 bearers established for UEs served by that relay base station. The PCRF could thus maintain a count on a per-relay-base-station basis of the quantity of QCI 1 bearers currently in place for UEs served by the relay base station.

As the PCRF tracks the quantity of such QCI 1 bearers established for UEs served by relay base station 34, the PCRF could monitor the count and could determine when the count reaches a threshold level. This threshold level could be based on the quantity of VoIP calls that were used in the assumption that formed the basis for setting the maximum bit rate of the QCI 1 bearer for the associated UE-relay 32 in the first place. For instance, if the assumption was that the maximum bit rate of the UE-relay's QCI 1 bearer should be set to a level suitable to accommodate up to five concurrent VoIP calls at up to a particular assumed per-call-bitrate, the threshold might be set to four end-user-UE QCI 1 bearers, or some other high percentage of the baseline expected quantity of calls. Further, the actual bit rates of the calls could be taken into consideration as well, as another basis for taking action.

Upon determining that the so-tracked count of QCI 1 bearers established for one or more UEs served by relay base station 34 has reached (e.g., met or exceeded) a threshold level, the PCRF could then take action to adjust the maximum bit rate of the QCI 1 bearer established for the associated relay-UE 32. For instance, when the PCRF detects that the tracked count of QCI 1 bearers established for UEs served by relay base station 34 has reached a threshold high level such as a threshold high count of such bearers, the PCRF could responsively take action to increase the maximum bit rate of the associated UE-relay's QCI 1 bearer. Or when the PCRF detects that the tracked count of QCI 1 bearers established for UEs served by the relay base station 34 has reached a threshold low level (e.g., dropping below, or sufficiently below, the threshold high level), the PCRF could responsively take action to decrease the maximum bit rate of the associated relay-UE's QCI 1 bearer.

To trigger adjustment of the maximum bit rate of the associated UE-relay's QCI 1 bearer, the PCRF could signal to the relay-gateway system, particularly to the relay-PGW, to direct that an adjustment be made to the associated maximum bit rate. Here, the PCRF could send a directive (e.g., a Re-Auth Request (RAR) message) to the relay-PGW, specifying the relay base station (e.g., ECGI) at issue and specifying a maximum-bit-rate adjustment to make or specifying a changed maximum-bit-rate to impose. The relay-PGW could then refer to data that correlates each of one or more relay base stations with associated relay-UE, to determine the relay-UE at issue. And the relay-PGW could then engage in a process to adjust the maximum bit rate of the relay-UE's QCI 1 bearer in accordance with the PCRF's directive.

To change the maximum bit rate of the relay-UE's QCI 1 bearer, the relay-PGW could generate and transmit to the relay-SGW a modify-bearer request, identifying the bearer at issue and specifying an adjustment to make to the bearer's designated maximum bit rate, and the relay-SGW could send an associated modify-bearer request to the MME 20. The MME could then engage in associated bearer-modification signaling with the relay-SGW and the donor base station 12, to direct that the designated maximum bit rate of the relay-UE's QCI 1 bearer be set to a particular adjusted level, and the donor base station, relay-SGW, and relay-PGW could update their context records for the relay-UE to indicate the new, adjusted maximum bit rate of the relay-UE's QCI 1 bearer.

In an arrangement where the adjustment of maximum bit rate is an increase in the maximum bit rate, the donor base station could then responsively increase the extent of air interface resources that it reserves to accommodate voice traffic flow on the relay-UE's bearer. And in an arrangement where the adjustment of maximum bit rate is a decrease in the maximum bit rate, the donor base station could then responsively decrease the extent of air interface resources that it reserves to accommodate voice traffic flow on the relay-UE's bearer.

Figure 2:
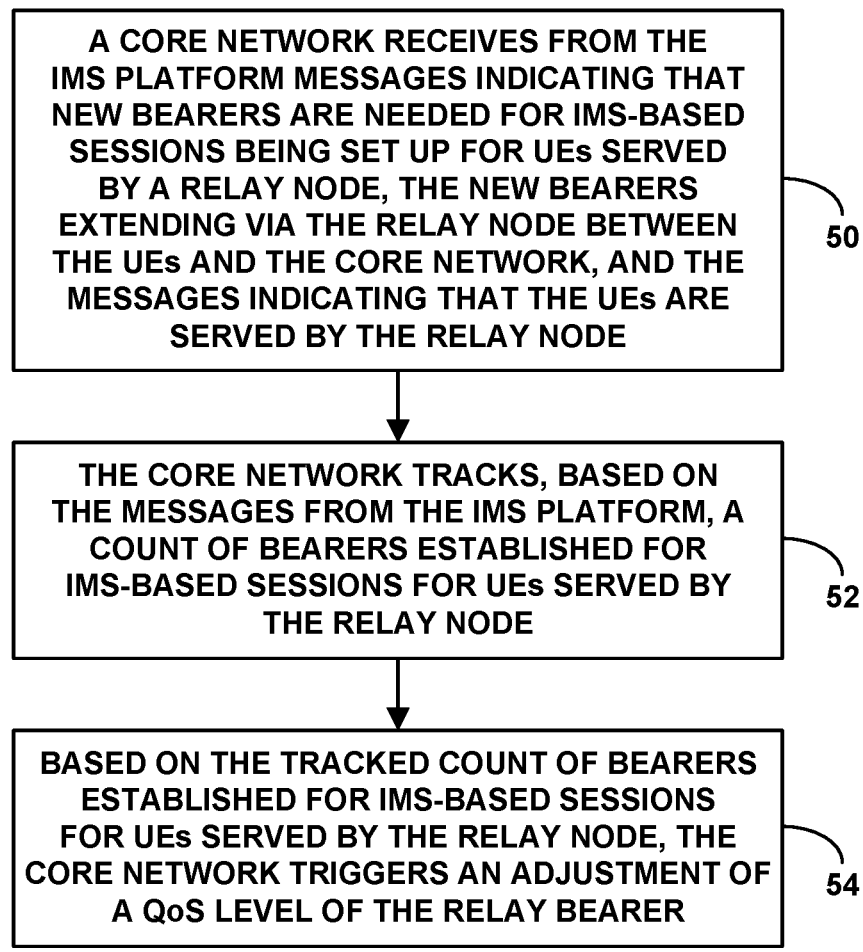
FIG. 2 is a flow chart depicting operations that can be carried out in accordance with the disclosure.

FIG. 2 is a flow chart depicting operations that can be carried out in accordance with this disclosure. In particular, the method is operable in a communication system in which a relay node is served by a donor base station and has a relay bearer extending via the donor base station between the relay node and a core network, where the relay bearer has a configured QoS level, and where the core network provides connectivity with an IMS platform.

As shown in FIG. 2, at block 50, the operations include the core network receiving from the IMS platform messages indicating that new bearers are needed (i.e., should be established if not already established) for IMS-based sessions being set up for UEs served by the relay node, the new bearers extending via the relay node between the UEs and the core network, and the messages indicating that the UEs are served by the relay node. Further, at block 52, the operations include the core network tracking, based on the messages from the IMS platform, a count of bearers established for IMS-based sessions for UEs served by the relay node. And at block 54, the operations include, based on the tracked count of bearers established for IMS-based sessions for UEs served by the relay node, the core network triggering an adjustment of the QoS level of the relay bearer.

In line with the discussion above, these receiving, tracking, and triggering operations could be carried out by a policy server, such as by a PCRF server. Alternatively or additionally, some or all of these operations could be carried out by one or more other network entities, such as by MME 20 for instance. Further, in line with the discussion above, the QoS level of the relay bearer could define a maximum bit rate of the relay bearer, in which case the act of triggering adjustment of the QoS level of the relay bearer could involve triggering adjustment of the maximum bit rate of the relay bearer.

As discussed above, the act of the core network triggering the adjustment of the QoS level of the relay bearer based on the tracked count of bearers established for IMS-based sessions for UEs served by the relay node could involve the policy server determining, based on the tracking based on the messages from the IMS platform, that the count of bearers established for IMS-based sessions for UEs served by the relay node meets or exceeds a predefined threshold count, and, in response to that determining, the policy server triggering adjustment of the QoS level of the relay bearer.

Further, as discussed above, the relay bearer could extend via the donor base station between the relay node and a relay gateway of the core network, and the act of triggering adjustment of the maximum bit rate of the relay bearer could involve transmitting from the policy server to the relay gateway a directive for adjustment of the maximum bit rate of the relay bearer. Moreover, the relay node could be served by a donor base station over an air interface that defines air interface resources, and the adjustment of the maximum bit rate of the relay bearer could cause the donor base station to adjust an extent of the air interface resources that the donor base station reserves to accommodate traffic flow on the relay bearer.

In a representative implementation, each IMS-based session at issue here could be a VoIP session, each new bearer could be a conversational-voice bearer for carrying voice traffic, and the relay bearer could also be a conversational-voice bearer for carrying voice traffic. For example, each conversational-voice bearer could be a QCI 1 bearer. In an alternative implementation, however, the IMS-based sessions could take other forms (e.g., other types of packet-based real-time media sessions) and bearers could correspondingly take other forms, still presenting the issue of the traffic on the bearers established for the IMS-based sessions flowing over the relay bearer at issue and thus presenting the issue of managing the maximum bit rate of the relay bearer.

In addition, as discussed above, for each IMS-based session being set up for a UE, at least one of the messages sent from the IMS platform to the policy server could indicate that the UE is being served by the relay node by specifying a relay node identifier (e.g., a PANI header that includes a unique ECGI of the relay base station component of the relay node, or another form of relay node identifier) that the UE provided to the IMS platform within session setup signaling (e.g., SIP signaling) for the IMS-based session. Thus the act of the core network (e.g., policy server) tracking, based on the messages from the IMS platform, the count of bearers established for IMS-based sessions for UEs served by the relay node could be based on the messages indicating that the UEs are served by the relay node.

Figure 3:
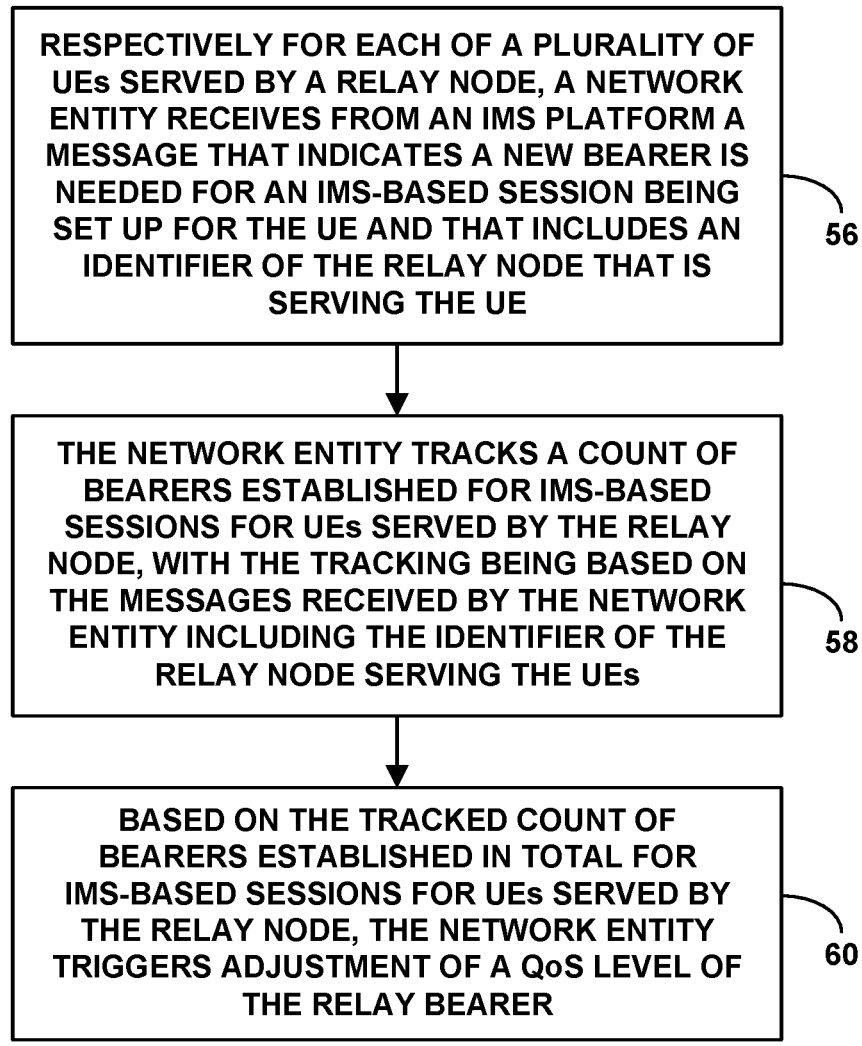
FIG. 3 is another flow chart depicting operations that can be carried out in accordance with the disclosure.

FIG. 3 is next another flow chart depicting operations that can be carried out in accordance with this disclosure in a system in which a relay node has an established relay bearer that has a configured QoS level. As shown in FIG. 3, at block 56, the operations include, respectively for each of a plurality of UEs served by the relay node, a network entity receiving from an IMS platform a message that indicates a new bearer is needed for an IMS-based session being set up for the UE and that includes an identifier of the relay node that is serving the UE. At block 58, the operations further include the network entity tracking a count of bearers established for IMS-based sessions for UEs served by the relay node, with the tracking being based on the messages received by the network entity including the identifier of the relay node serving the UEs. And at block 60, the operations include, based on the so-tracked count of bearers established in total for IMS-based sessions for UEs served by the relay node, the network entity triggering adjustment of the QoS level of the relay bearer.

Various features discussed above can be incorporated in the context of this method and vice versa. For example, the network entity here could be a policy server such as a PCRF server for instance. Further, the QoS level of the relay bearer could define a maximum bit rate of the relay bearer, and triggering adjustment of the QoS level of the relay bearer could involve triggering adjustment of the maximum bit rate of the relay bearer. (Alternatively or additionally, the QoS level could comprise other QoS-related attributes, and triggering adjustment of the QoS level of the relay bearer could take other forms.)

Still further, the relay bearer could extend via the donor base station between the relay node and a relay gateway, and triggering adjustment of the maximum bit rate of the relay bearer could involve transmitting from the policy server to the relay gateway a directive for adjustment of the maximum bit rate of the relay bearer. Moreover, the relay node could be served by the donor base station over an air interface defining air interface resources, and adjustment of the maximum bit rate of the relay bearer could cause the donor base station to adjust an extent of the air interface resources that the donor base station reserves to accommodate traffic flow on the relay bearer. And as discussed above, each IMS-based session could be a VoIP session, each new bearer could be a conversational-voice bearer (e.g., QCI 1 bearer) for carrying voice traffic, and the relay bearer could also be a conversational-voice bearer (e.g., QCI 1 bearer) for carrying voice traffic.

Figure 4:
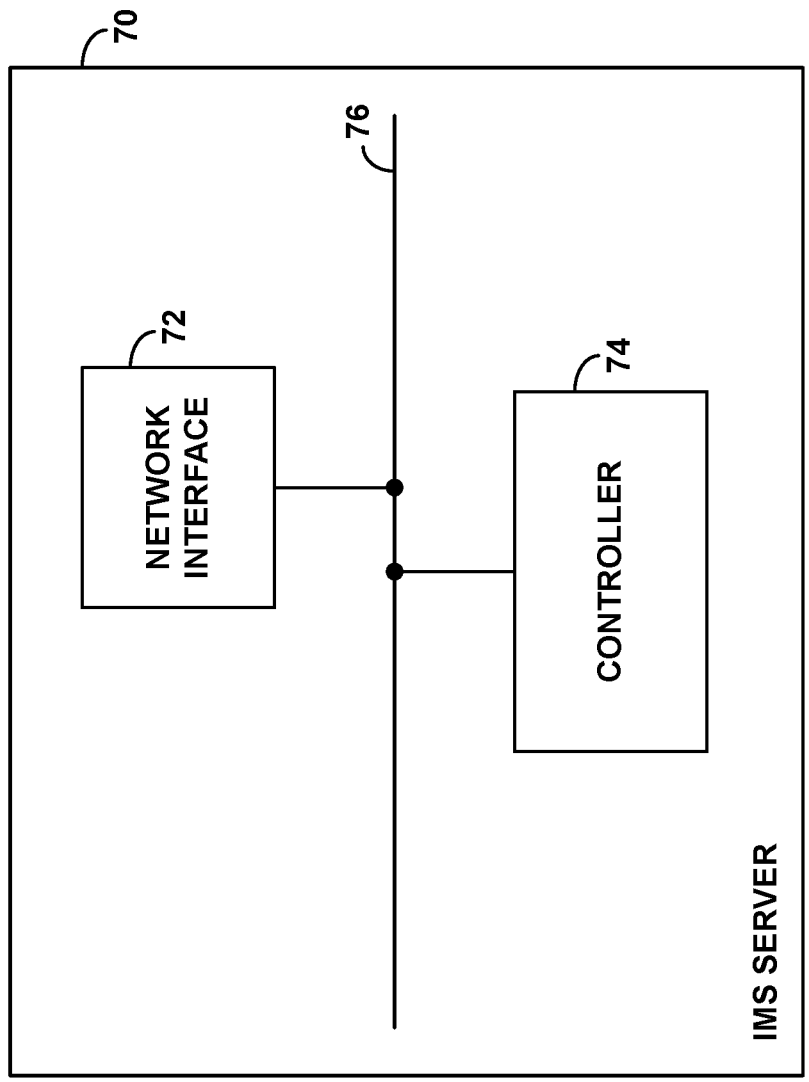
FIG. 4 is a simplified block diagram of an IMS server operable in accordance with the disclosure.

FIG. 4 is next a simplified block diagram of an example server 70 of an IMS platform (e.g., a CSCF of an IMS platform), showing some of the components that could be included in such an entity to facilitate carrying out features of the present disclosure. As shown in FIG. 4, server 70 includes a network communication interface 72 and a controller 74, with these or other components being communicatively linked together by a system bus, network, or other connection mechanism 76.

Network communication interface 72 operates to facilitate communication between server 70 and various other network entities, such as a gateway (e.g., the PGW of the conventional-gateway system 16) and a policy server (e.g., PCRF 40). As such, the interface could include one or more network interface modules, such as Ethernet network interface modules for instance or may take any of a variety of other forms, supporting wireless and/or wired communication with these and other components.

Controller 74 could then be configured to carry out various IMS platform operations described above. For instance, controller 74 could be configured to receive a request to set up a communication session with a UE being served by a given relay base station in the network, where the request includes an identifier of the relay base station. Further, controller 74 could be configured to send a signaling message to a policy server (e.g., PCRF 40) requesting establishment and/or configuration for the UE of a new bearer to carry traffic of the communication session, where this signaling message includes an identifier of the given relay base station. Controller 74 could be configured to carry out various other functions as well.

In practice, controller 74 could take various forms, including various combinations of hardware, software, and/or firmware. For example, controller 74 could comprise one or more general-purpose and/or special-purpose processors and a non-transitory computer readable medium (e.g., volatile and/or non-volatile memory and/or other data storage elements) that stores executable instructions. The executable instructions, when executed by the one or more processors, could cause controller 74 (and thus server 70) to perform any of the IMS platform functions described herein.

Figure 5:
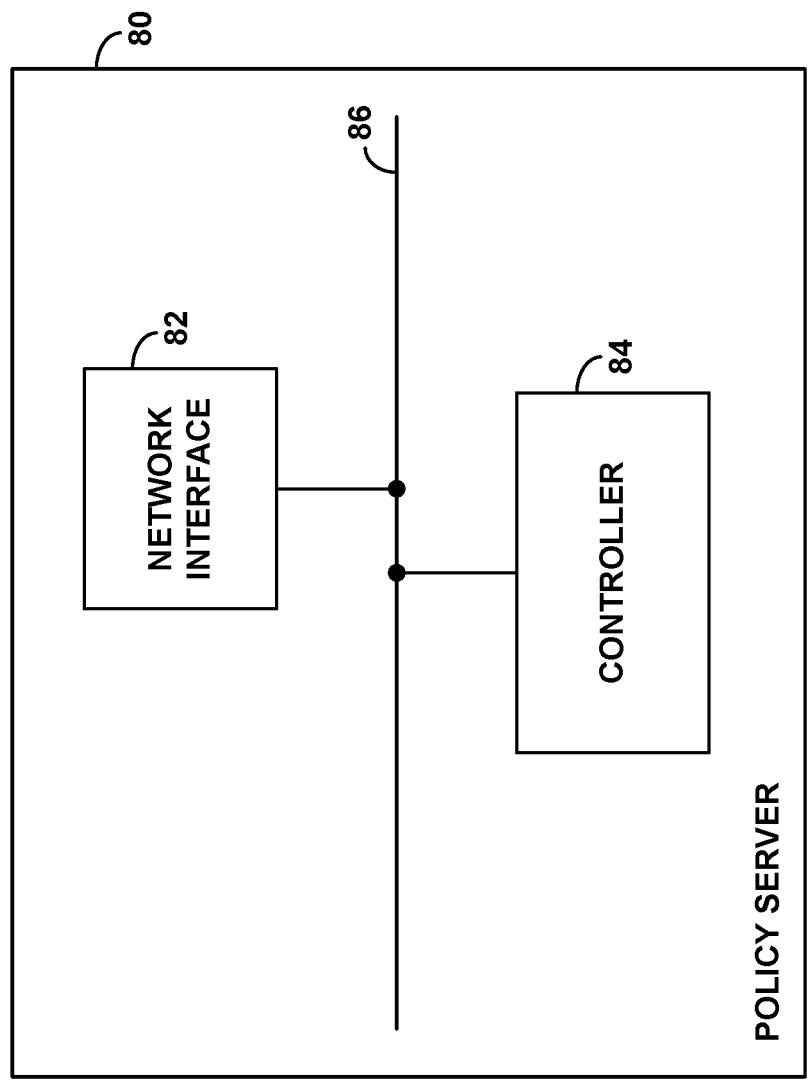
FIG. 5 is a simplified block diagram of a policy server operable in accordance with the disclosure.

FIG. 5 is next a simplified block diagram of an example policy server 80 (e.g., a PCRF 40 or the like), showing some of the functional components that could be included in such an entity to facilitate carrying out features of the present disclosure. As shown in FIG. 5, policy server 80 includes a network communication interface 82 and a controller 84, with these or other components being communicatively linked together by a system bus, network, or other connection mechanism 86.

Network communication interface 82 functions to facilitate communication between policy server 80 and various other network entities, such as the gateway systems 14, 16 and the IMS platform 42. As such, the interface could include one or more network interface modules, such as Ethernet network interface modules for instance or could take any of a variety of other forms, supporting wireless and/or wired communication with these and other components.

Controller 84 could then be configured to carry out various policy-server operations as described above, to control QoS level of a relay bearer established for a relay node. For instance the controller could receive from an IMS platform, respectively for each of a plurality of UEs served by the relay node, a message that indicates that a new bearer is needed for an IMS-based session being set up for the UE and that includes an identifier of the relay node that is serving the UE. And the controller could track a count of bearers established for IMS-based sessions for UEs served by the relay node, with the tracking being based on the each received message including the identifier of the relay node, and could, based on the tracked count of bearers established for IMS-based sessions for UEs served by the relay node, trigger adjustment of the QoS level of the relay bearer.

Various features discussed above can be incorporated here as well, and vice versa. For instance, the QoS level of the relay bearer could define a maximum bit rate of the relay bearer, and triggering adjustment of the QoS level of the relay bearer could involve triggering adjustment of the maximum bit rate of the relay bearer. Further, each IMS-based session could be a VoIP session, each new bearer could be a conversational-voice bearer for carrying voice traffic of an associated VoIP session, and the relay bearer could also be conversational-voice bearer. And still further, for each IMS-based session being set up for a UE, the message received by the policy server from the IMS platform could include the identifier of the relay node based on the IMS platform having received the identifier of the relay node in signaling from the UE for setup of the IMS-based session.

In practice, controller 84 could take various forms, including various combinations of hardware, software, and/or firmware. For example, controller 84 could include a processing unit (e.g., one or more general-purpose and/or special-purpose processors), non-transitory data storage (e.g., one or more volatile and/or non-volatile memory and/or other data storage elements, such as optical, magnetic, and/or flash storage), and program instructions stored in the non-transitory data storage and executable by the processing unit to carry out (and thus cause the policy server to carry out) operations such as those noted above.

Exemplary embodiments have been described above. Those skilled in the art will understand, however, that changes and modifications may be made to these embodiments without departing from the true scope and spirit of the invention.

What is claimed is:

1. A method operable in a communication system in which a relay node is served by a donor base station and has a relay bearer extending via the donor base station between the relay node and a core network, wherein the relay bearer has a configured quality of service (QoS) level, and wherein the core network provides connectivity with an Internet Multimedia Subsystem (IMS) platform, the method comprising:

receiving by the core network, from the IMS platform, messages indicating that new end-user bearers are needed for IMS-based sessions being set up for user equipment devices (UEs) served by the relay node, the end-user bearers extending via the relay node and relay bearer between the UEs and the core network, the messages further indicating that the UEs are served by the relay node;

tracking by the core network, based on the messages from the IMS platform, a count of the end-user bearers established for IMS-based sessions for UEs served by the relay node; and based on the tracked count of the end-user bearers established for IMS-based sessions for UEs served by the relay node, triggering by the core network an adjustment of the QoS level of the relay bearer, wherein the receiving, tracking, and triggering are carried out by a policy server, wherein the QoS level of the relay bearer defines a maximum bit rate of the relay bearer, and wherein triggering adjustment of the QoS level of the relay bearer comprises triggering adjustment of the maximum bit rate of the relay bearer, and wherein the relay node is served by the donor base station over an air interface defining air interface resources, and wherein adjustment of the maximum bit rate of the relay bearer causes the donor base station to adjust an extent of the air interface resources that the donor base station reserves to accommodate traffic flow on the relay bearer.

2. The method of claim 1, wherein triggering by the core network the adjustment of the QoS level of the relay bearer based on the tracked count of end-user bearers established for IMS-based sessions for UEs served by the relay node comprises:

determining by the policy server, based on the tracking based on the messages from the IMS platform, that the count of end-user bearers established for IMS-based sessions for UEs served by the relay node meets or exceeds a predefined threshold count; and responsive to the determining, triggering by the policy server adjustment of the QoS level of the relay bearer.

3. The method of claim 1, wherein the relay bearer extends via the donor base station between the relay node and a relay gateway of the core network, and wherein triggering adjustment of the maximum bit rate of the relay bearer comprises transmitting from the policy server to the relay gateway a directive for adjustment of the maximum bit rate of the relay bearer.

4. The method of claim 1, wherein each IMS-based session is a voice over Internet Protocol (VoIP) session, wherein each end-user bearer is a conversational-voice bearer for carrying voice traffic, and wherein the relay bearer is also a conversational-voice bearer for carrying voice traffic.

5. The method of claim 1, wherein for each IMS-based session being set up for a UE, at least one of the messages from the IMS platform to the policy server indicates that the UE is being served by the relay node by specifying a relay node identifier that the UE provided to the IMS platform within session setup signaling for the IMS-based session.

6. The method of claim 5, wherein the signaling from the UE comprises Session Initiation Protocol signaling.

7. The method of claim 1, wherein tracking based on the messages from the IMS platform the count of end-user bearers established for IMS-based sessions for UEs served by the relay node is based on the messages indicating that the UEs are served by the relay node.

8. A method comprising:

respectively for each of a plurality of user equipment devices (UEs) served by a relay node, a network entity receiving from an Internet Multimedia Subsystem (IMS) platform a message that indicates a new end-user bearer is needed for an IMS-based session being set up for the UE and that includes an identifier of the relay node that is serving the UE, wherein the relay node has an established relay bearer having a configured quality of service (QoS) level, and wherein the end-user bearer will be via the relay bearer;

tracking by the network entity a count of the end-user bearers established for IMS-based sessions for UEs served by the relay node, the tracking being based on the messages received by the network entity including the identifier of the relay node serving the UEs; and based on the tracked count of the end-user bearers established in total for IMS-based sessions for UEs served by the relay node, the network entity triggering adjustment of the QoS level of the relay bearer, wherein the network entity is a policy server, and wherein the QoS level of the relay bearer defines a maximum bit rate of the relay bearer, and wherein triggering adjustment of the QoS level of the relay bearer comprises triggering adjustment of the maximum bit rate of the relay bearer, and wherein triggering the adjustment of the QoS level of the relay bearer based on the tracked count of end-user bearers established in total for IMS-based sessions for UEs served by the relay node comprises (i) determining, based on the tracking based on the messages from the IMS platform, that the count of end-user bearers established for IMS-based sessions for UEs served by the relay node meets or exceeds a predefined threshold count and (ii) responsive to the determining, triggering adjustment of the QoS level of the relay bearer.

9. The method of claim 8, wherein the relay bearer extends via a donor base station between the relay node and a relay gateway, and wherein triggering adjustment of the maximum bit rate of the relay bearer comprises transmitting from the policy server to the relay gateway a directive for adjustment of the maximum bit rate of the relay bearer.

10. The method of claim 8, wherein the relay node is served by a donor base station over an air interface defining air interface resources, and wherein adjustment of the maximum bit rate of the relay bearer causes the donor base station to adjust an extent of the air interface resources that the donor base station reserves to accommodate traffic flow on the relay bearer.

11. The method of claim 8, wherein each IMS-based session is a voice over Internet Protocol (VoIP) session, wherein each end-user bearer is a conversational-voice bearer for carrying voice traffic, and wherein the relay bearer is also a conversational-voice bearer for carrying voice traffic.

12. A policy server comprising:

a network communication interface; and a controller configured to control quality of service (QoS) level of a relay bearer established for a relay node, wherein the controller comprises a processing unit, non-transitory data storage, and program instructions stored in the non-transitory data storage and executable by the processing unit to carry out a plurality of operations, wherein the operations include receiving from an Internet Multimedia Subsystem (IMS) platform, respectively for each of a plurality of user equipment devices (UEs) served by the relay node, a message that indicates that a new end-user bearer is needed for an IMS-based session being set up for the UE and that includes an identifier of the relay node that is serving the UE, wherein the end-user bearer will be via the relay bearer, and wherein the operations further include (i) tracking a count of the end-user bearers established for IMS-based sessions for UEs served by the relay node, the tracking being based on the each received message including the identifier of the relay node, and (ii) based on the tracked count of the end-user bearers established for IMS-based sessions for UEs served by the relay node, triggering adjustment of the QoS level of the relay bearer, wherein the QoS level of the relay bearer defines a maximum bit rate of the relay bearer, and wherein triggering adjustment of the QoS level of the relay bearer comprises triggering adjustment of the maximum bit rate of the relay bearer, and wherein the relay node is served by a donor base station over an air interface defining air interface resources, and wherein adjustment of the maximum bit rate of the relay bearer causes the donor base station to adjust an extent of the air interface resources that the donor base station reserves to accommodate traffic flow on the relay bearer.

13. The policy server of claim 12, wherein each IMS-based session is a voice over Internet Protocol (VoIP) session, wherein each end-user bearer is a conversational-voice bearer for carrying voice traffic of an associated VoIP session, and wherein the relay bearer is also a conversational-voice bearer.

14. The policy server of claim 12, wherein for each IMS-based session being set up for a UE, the message received by the policy server from the IMS platform includes the identifier of the relay node based on the IMS platform having received the identifier of the relay node in signaling from the UE for setup of the IMS-based session.

* * * * *